(12) United States Patent
Kidder et al.

(10) Patent No.: US 11,320,058 B2
(45) Date of Patent: May 3, 2022

(54) MODULAR FLUID MANIFOLD ASSEMBLY WITH ANTI-ROTATION ELEMENTS

(71) Applicant: Parker-Hannifin Corporation, Cleveland, OH (US)

(72) Inventors: Joshua D. Kidder, Richland, MI (US); Yufeng Qi, Grand Rapids, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 161 days.

(21) Appl. No.: 16/673,023

(22) Filed: Nov. 4, 2019

(65) Prior Publication Data

US 2020/0149650 A1    May 14, 2020

Related U.S. Application Data

(60) Provisional application No. 62/758,730, filed on Nov. 12, 2018.

(51) Int. Cl.
*F16K 27/00* (2006.01)
*F16K 11/22* (2006.01)
(Continued)

(52) U.S. Cl.
CPC ........ *F16K 27/003* (2013.01); *F15B 13/0817* (2013.01); *F16K 11/22* (2013.01); *F16K 31/12* (2013.01)

(58) Field of Classification Search
CPC ........... Y10T 137/87885; F16K 27/003; F16K 11/22; F15B 13/0817; F15B 13/0821
See application file for complete search history.

(56) References Cited

U.S. PATENT DOCUMENTS

| 4,070,045 A | * | 1/1978 | Colter | ..................... F16L 37/26 |
| | | | | 184/55.2 |
| 4,082,324 A | * | 4/1978 | Obrecht | .............. F15B 13/0814 |
| | | | | 285/124.5 |

(Continued)

OTHER PUBLICATIONS

Parker Hannifin Ltd., "H Series ISO Valves, a complete range of pneumatic ISO valves", Catalogue PDE2589TCUK, Published May 2016.

*Primary Examiner* — Seth W. MacKay-Smith
(74) *Attorney, Agent, or Firm* — Renner, Otto, Boisselle & Sklar, LLP (57) ABSTRACT

A fluid manifold assembly for a valve bank is provided, in which the manifold assembly includes a plurality of modular fluid manifolds that are operatively coupled together, and each modular manifold includes one or more anti-rotation elements that cooperate with each other to minimize rotation of the modular manifolds relative to each other, such as during assembly. The anti-rotation elements may include anti-rotation protrusion(s) that extend outwardly from a mating face of a first modular manifold body, and anti-rotation recess(es) that extend inwardly from a corresponding mating face of a second modular manifold body, in which the anti-rotation protrusion(s) of the first body are configured to be received by the anti-rotation recess(es) of the second body. The anti-rotation elements may be configured to interface with each other with particular tolerances that facilitate ease of assembly of the fluid manifold assembly, while minimizing tolerance stack-up.

20 Claims, 7 Drawing Sheets

(51) Int. Cl.
*F15B 13/08* (2006.01)
*F16K 31/12* (2006.01)

(56) References Cited

U.S. PATENT DOCUMENTS

| | | | | |
|---|---|---|---|---|
| 5,845,679 | A * | 12/1998 | Hayashi | F15B 13/0867 |
| | | | | 137/625.64 |
| 6,240,941 | B1 * | 6/2001 | Small | F16K 27/003 |
| | | | | 137/1 |
| 6,832,788 | B2 * | 12/2004 | Fukano | F16L 37/144 |
| | | | | 285/124.4 |
| 6,892,764 | B2 * | 5/2005 | Rodrigues | F16K 27/003 |
| | | | | 137/884 |
| 6,951,226 | B2 * | 10/2005 | Eriksson | F15B 13/0817 |
| | | | | 137/269 |
| 7,484,770 | B2 * | 2/2009 | Hamada | F16L 41/03 |
| | | | | 285/124.4 |
| 2001/0011557 | A1 * | 8/2001 | Pecci | F16K 27/003 |
| | | | | 137/597 |

* cited by examiner

MODULAR FLUID MANIFOLD ASSEMBLY WITH ANTI-ROTATION ELEMENTS

RELATED APPLICATIONS

This application claims the benefit of U.S. Provisional Application No. 62/758,730 filed Nov. 12, 2018, which is hereby incorporated herein by reference in its entirety.

TECHNICAL FIELD

The present disclosure relates generally to valve banks, such as for hydraulic or pneumatic control, and more particularly to modular fluid manifolds and/or manifold assemblies for such valve banks.

BACKGROUND

Control valves are commonly used to control one or more actuators or other movable members in a hydraulic or pneumatic system, such as for use in operating machinery in a factory, for example. Each movable member in the system is typically controlled by the movement of a valve member, such as a spool, that moves within a valve body to permit, restrict and/or control the flow of the working fluid through different fluid passages in the valve body, thereby controlling the movement of the actuator or other movable member. A valve bank is an assembly of such control device(s), which may include a single control valve to operate a single movable member, or which may include a plurality of control valves to operate a plurality of movable members.

Typically the valve bank includes a plurality of valve sections, in which each valve section has a base that constitutes a fluid manifold through which operating fluid is communicated to operate the control device(s). Generally, each valve section may be configured as a discrete modular unit of the valve bank, in which each valve section has a corresponding modular fluid manifold. These modular fluid manifolds are fluidly coupled together to form a manifold valve assembly that provides a continuous fluid flow path across the various modular manifolds. This allows the operating fluid to be supplied from a source into one or more of the modular manifolds, such that the fluid can then flow downstream through the other modular fluid manifolds to supply the operating fluid to the control device(s).

The assembly of the modular fluid manifolds typically utilizes fasteners that are inserted through through-holes in one of the modular fluid manifolds, and which are threadably received within threaded bores of the adjacently coupled modular fluid manifold. The tightening of these fasteners generates torque that can cause rotation of one of the modular manifolds relative to the adjacently coupled manifold. Some valve banks may have many valve sections, in which case the rotation of each manifold relative to its neighbor may be compounded over the length of the valve bank. In some cases, this compounding effect may result in large gaps toward either end of the valve bank which may cause leakage of the operating fluid.

SUMMARY

The present disclosure provides a unique fluid manifold assembly in which the modular fluid manifolds of the assembly include one or more anti-rotation elements that cooperate with each other to minimize rotation of the modular manifolds relative to each other.

The anti-rotation elements may include anti-rotation protrusion(s) that extend outwardly from a mating face of a first modular manifold body, and anti-rotation recess(es) that extend inwardly from a corresponding mating face of a second modular manifold body, in which the anti-rotation protrusion(s) are configured to be received by the anti-rotation recess(es) to minimize relative rotation of the manifold bodies.

The anti-rotation elements may be configured with unique tolerances that are configured to facilitate ease of assembly of the fluid manifold assembly, while also minimizing stack-up. For example, one or more of the anti-rotation protrusions of a first manifold body may be configured to mate with one or more anti-rotation recesses of a second manifold body in such a way to provide a slip-fit tolerance and/or zero clearance with respect to each other. In addition, one or more other anti-rotation protrusions of the first manifold body may be configured to mate with one or more other anti-rotation recesses of the second manifold body in such a way to provide a greater amount of tolerance than a slip-fit tolerance and/or zero clearance. Such a configuration may prevent each modular manifold from compounding the amount of twisting that each manifold can experience, since the relative tolerances will instead counteract each other.

More particularly, such a configuration, in essence, may create a statistical stack-up of near or at zero, since the slip-fit and/or zero tolerancing of some of the anti-rotation elements centers the mean of the tolerance at or near zero, and the anti-rotation elements with the greater tolerance will allow some units to be at the high side of the tolerance range, and some units will be at the low side of the tolerance range, which causes the mean over assembling multiple such units to be at or near zero. Such a reduction in the compounding effect over multiple-coupled manifolds may prevent large gaps from forming at either end of the valve bank, which can prevent leakage of the operating fluid, for example.

According to one aspect of the invention, a fluid manifold assembly for a valve bank includes: a first modular fluid manifold having a first manifold body, the first manifold body having a first mating face, and an anti-rotation protrusion extending outwardly from the first mating face; a second modular fluid manifold having a second manifold body, the second manifold body having a second mating face, and an anti-rotation recess extending inwardly from the second mating face; wherein the first manifold body is operatively coupled to the second manifold body such that the first mating face is adjacent to the second mating face, and such that the anti-rotation protrusion of the first manifold body is received by the anti-rotation recess of the second manifold body; and wherein the anti-rotation protrusion and the anti-rotation recess are configured to cooperate with each other to minimize rotation of the first manifold body relative to the second manifold body.

According to another aspect of the invention, a fluid manifold assembly for a valve bank includes: a first modular fluid manifold having a first manifold body, the first manifold body having a first mating face, and having first and second anti-rotation protrusions extending outwardly from the first mating face; a second modular fluid manifold having a second manifold body, the second manifold body having a second mating face, and having first and second anti-rotation recesses extending inwardly from the second mating face; wherein the first manifold body is operatively coupled to the second manifold body such that the first mating face is adjacent to the second mating face, and such that the first anti-rotation protrusion is received by the first anti-rotation recess and the second anti-rotation protrusion is received by the second anti-rotation recess; wherein the first anti-rotation protrusion and the first anti-rotation recess are respectively configured to provide a slip-fit tolerance with respect to each other when the first manifold body is operatively coupled to the second manifold body; and wherein the second anti-rotation protrusion and the second anti-rotation recess are respectively configured to provide a tolerance with respect to each other that is greater than a slip-fit tolerance when the first manifold body is operatively coupled to the second manifold body.

According to another aspect of the invention, a modular fluid manifold includes: a manifold body having a first mating face on one side of the manifold body, and a second mating face on an opposite side of the manifold body, one or more fluid ports on the first and/or second mating face; one or more anti-rotation protrusions extending outwardly from the first mating face; and one or more anti-rotation recesses extending inwardly from the second mating face; wherein the locations of the one or more anti-rotation protrusions are a mirror image of the locations of the one or more anti-rotation recesses relative to a plane that bisects the manifold body and that is parallel to both the first and second mating faces.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of the present invention have particular application to pneumatic valve banks, and more particularly to a modular manifold assembly for such valve banks, which may be used for automation control in a factory, and thus will be described below chiefly in this context. It is understood, however, that the principles and aspects of the present invention may be applicable to other valve banks for other applications where it is desirable to provide anti-rotation features that minimize rotation of the modular fluid manifolds relative to each other and/or where it is desirable to provide the modular manifolds with anti-rotation elements that have unique tolerances for facilitating ease of assembly while also minimizing stack-up, such as may be used with hydraulic or other valve banks for use in assembly plants, on machines, vehicles, or the like.

Figure 1:
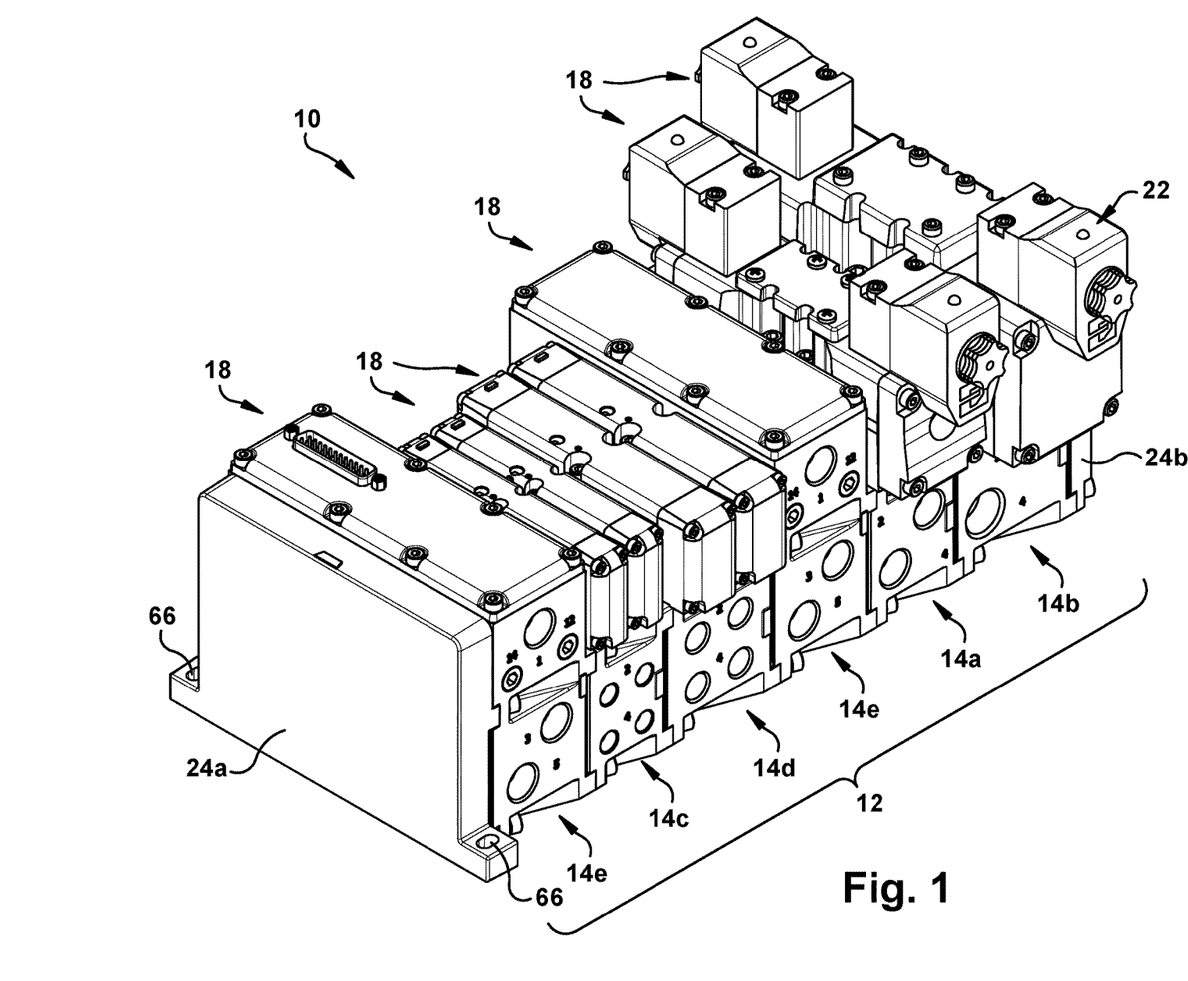
FIG. 1 is a top, front, left perspective view of an exemplary valve bank, including an exemplary fluid manifold assembly having a plurality of exemplary modular fluid manifolds.
Figure 2:
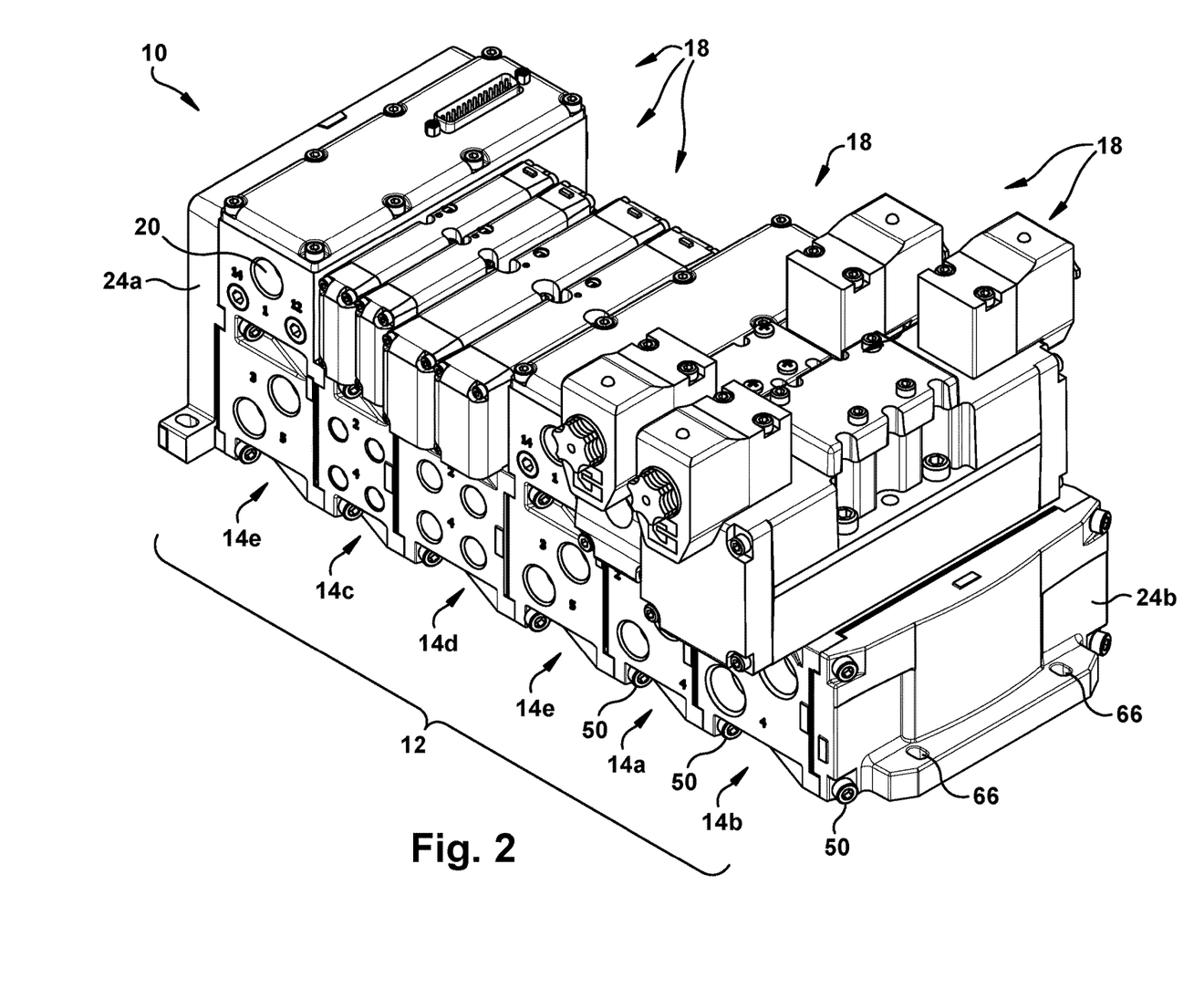
FIG. 2 is a top, front, right perspective view of the valve bank.
Figure 3:
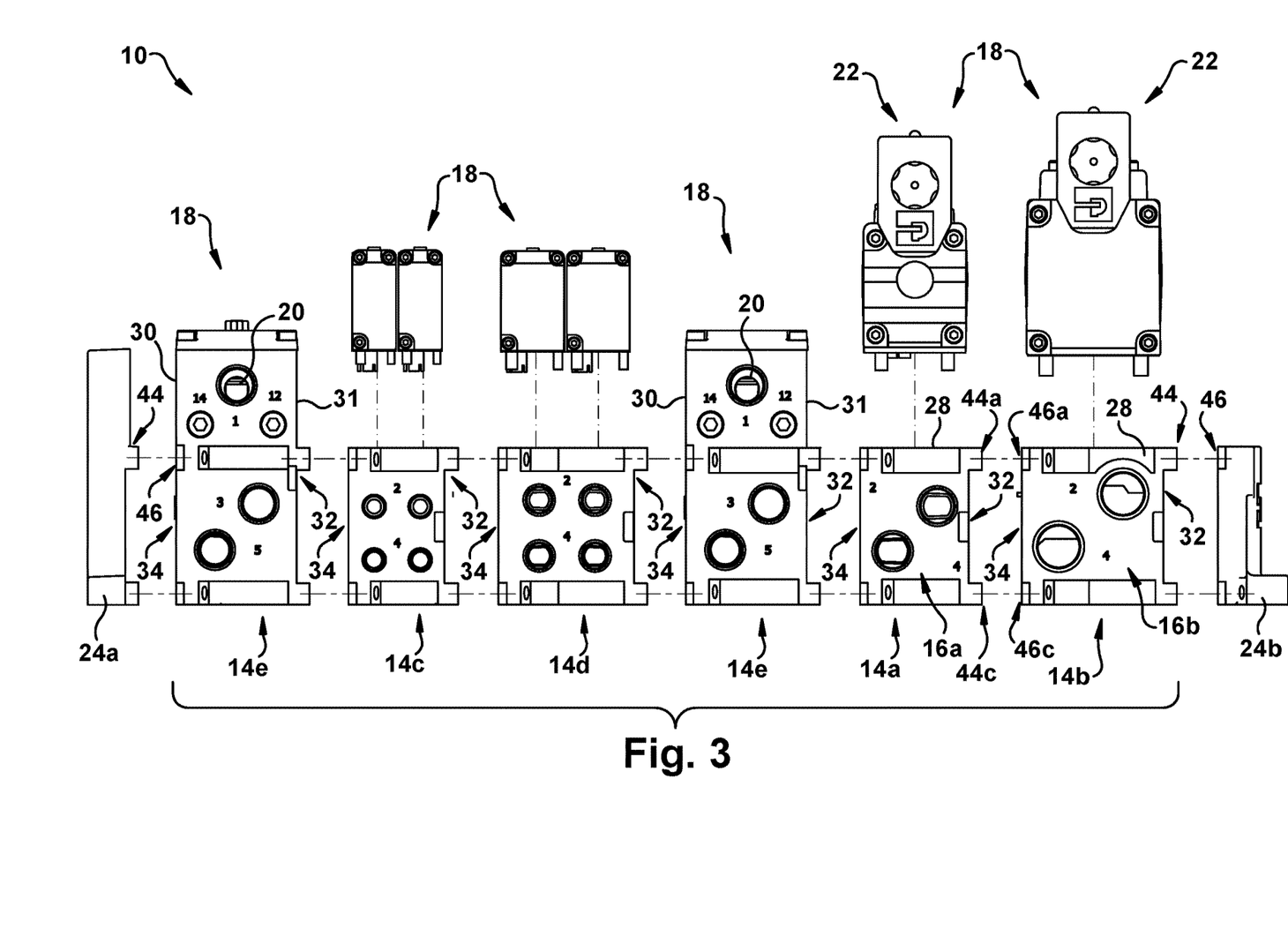
FIG. 3 is an exploded front plan view of the valve bank.
Figure 4:
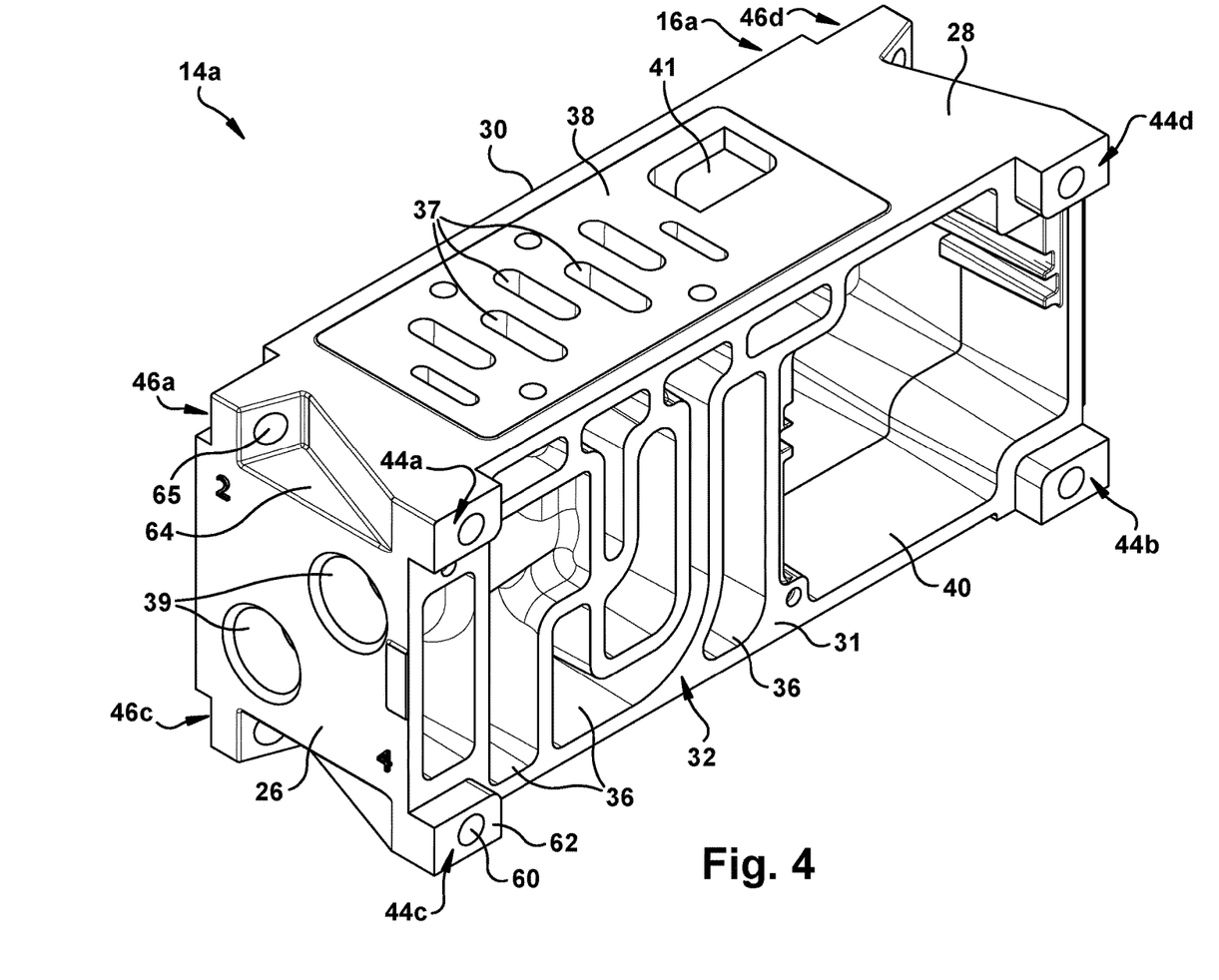
FIG. 4 is a top, front, right perspective view of one of the exemplary modular fluid manifolds of the manifold assembly in FIG. 1.
Figure 5:
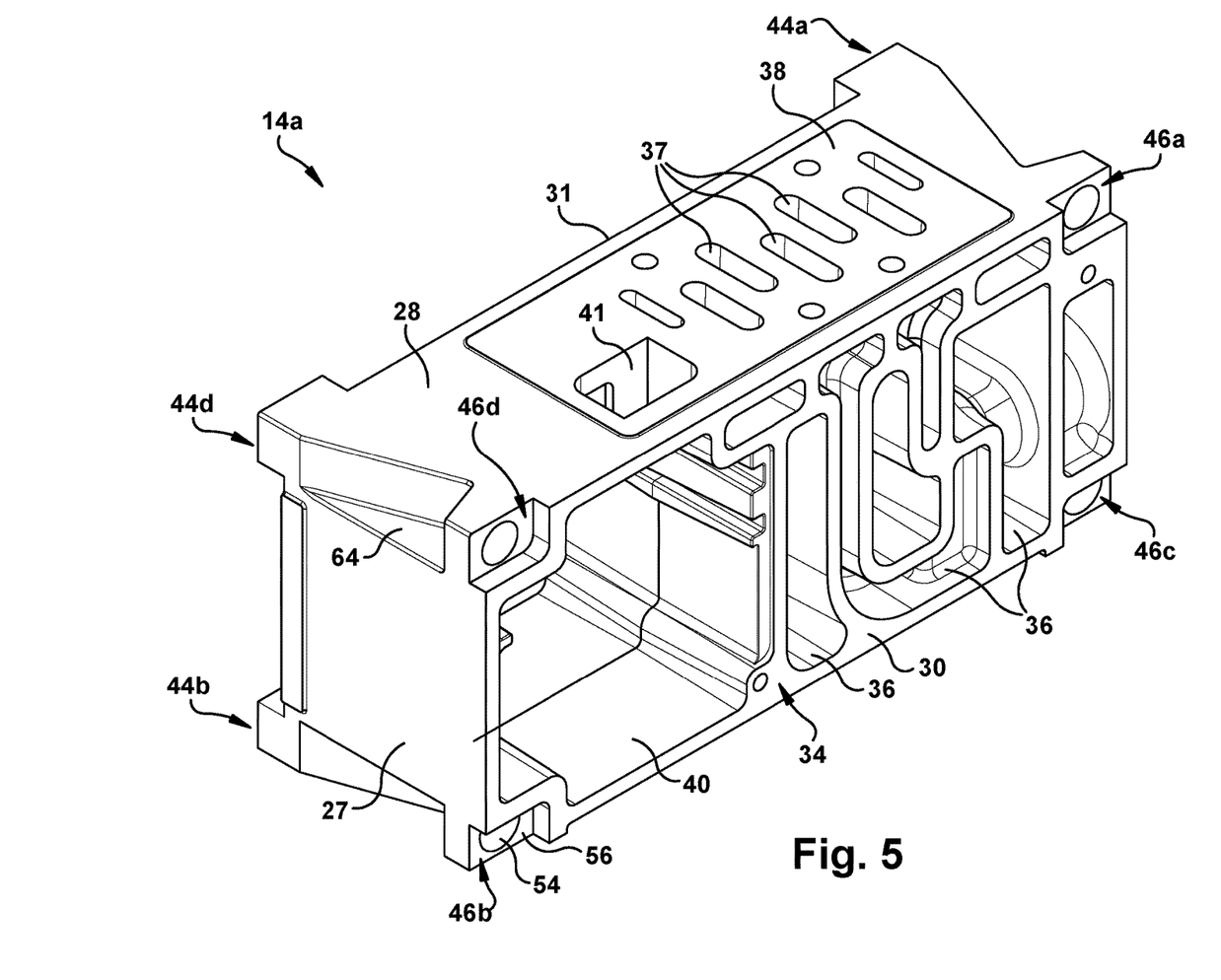
FIG. 5 is a top, rear, left perspective view of the modular fluid manifold.
Figure 6:
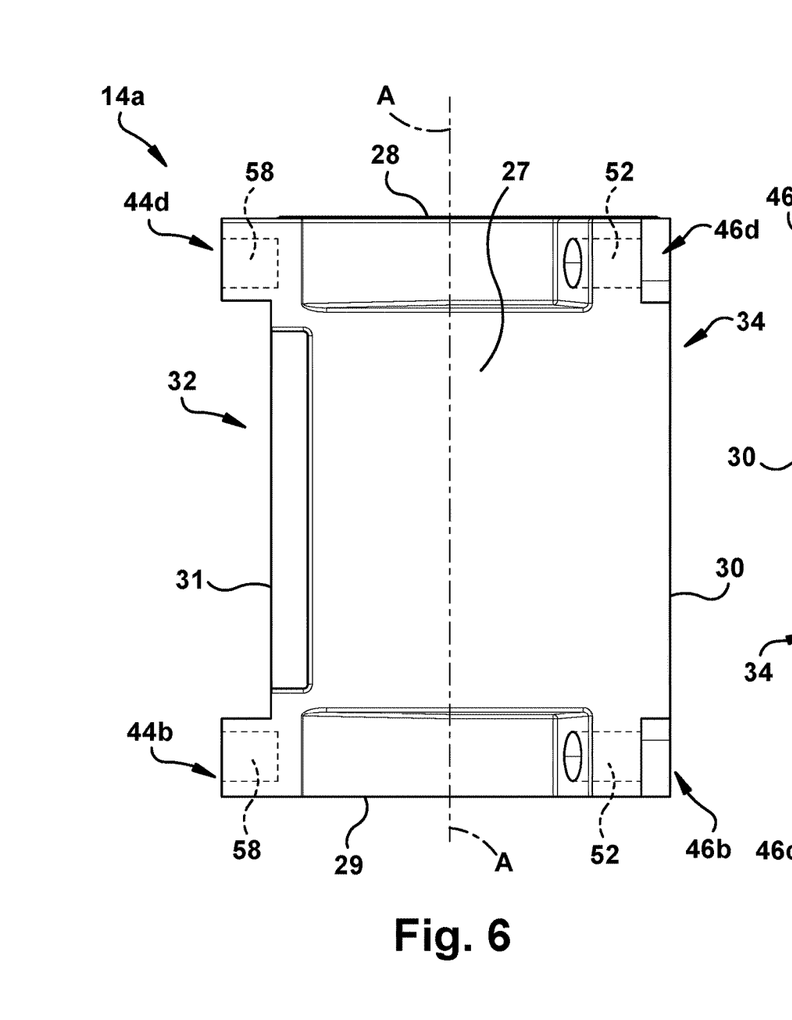
FIG. 6 is a rear plan view of the modular fluid manifold.
Figure 7:
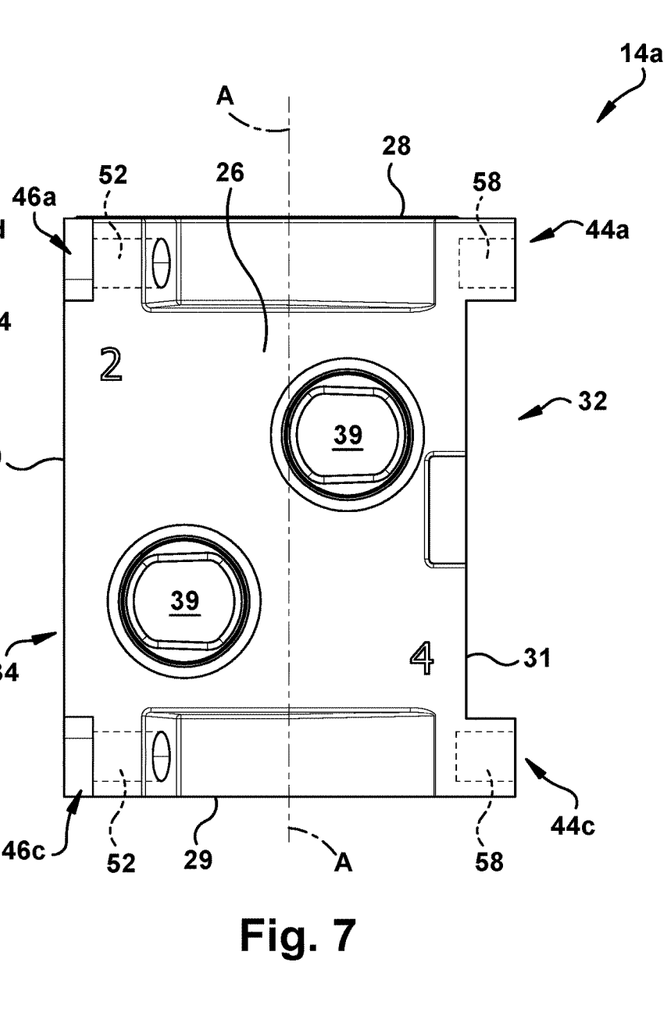
FIG. 7 is a front plan view of the modular fluid manifold.
Figure 8:
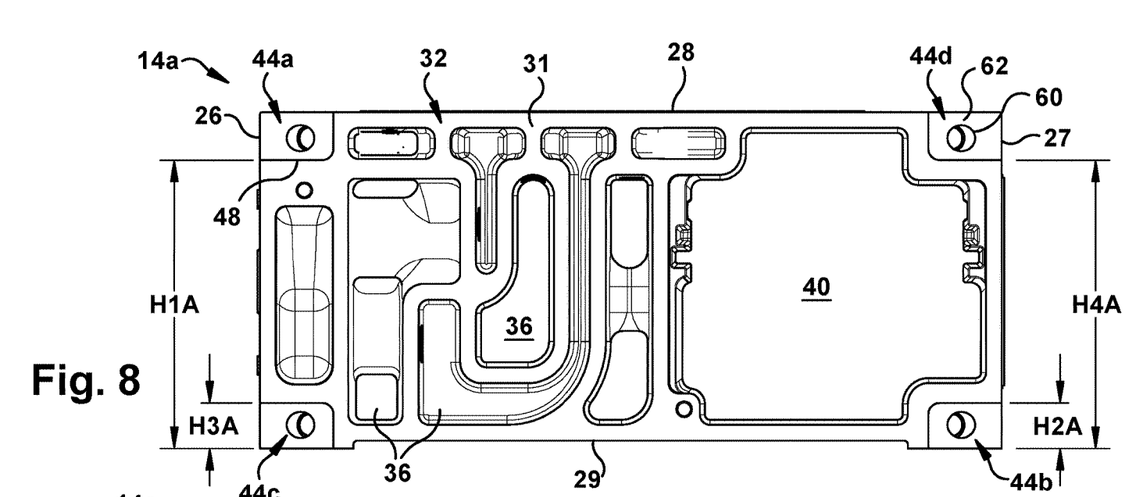
FIG. 8 is a right side plan view of the modular fluid manifold.
Figure 9:
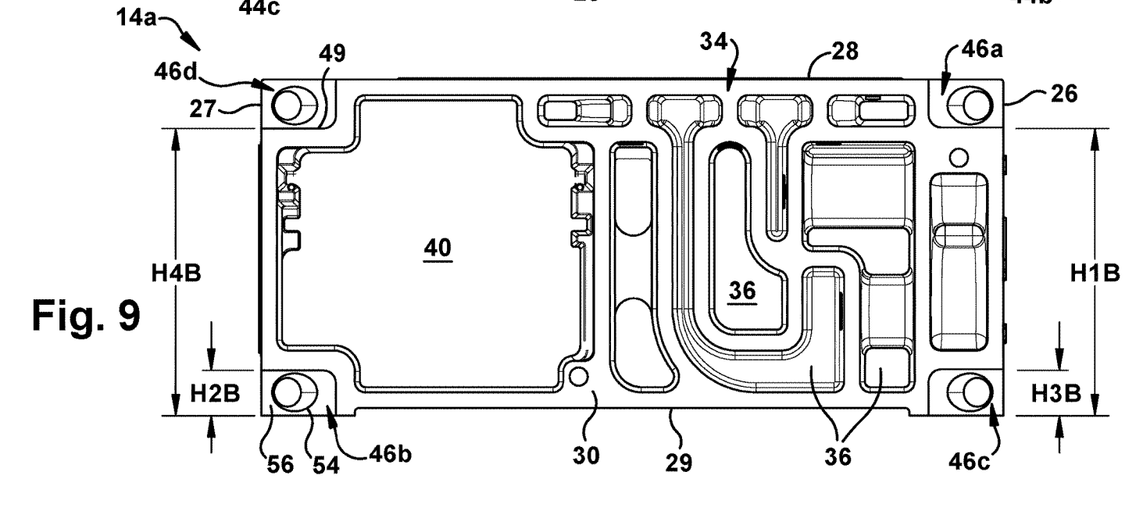
FIG. 9 is a left side plan view of the modular fluid manifold.

Referring to FIGS. 1-3, an exemplary valve bank 10 including an exemplary fluid manifold assembly 12 is shown. The exemplary fluid manifold assembly 12 includes a plurality of exemplary modular fluid manifolds 14a-14e, and an example of one such modular manifold 14a is shown in further detail in FIGS. 4-9. As described in further detail below, each modular fluid manifold (e.g., 14a) includes a manifold body (e.g., 16a) that is configured to interface with a manifold body (e.g., 16b) of an adjacent modular manifold (e.g., 14b), and each manifold body includes one or more anti-rotation elements that cooperate with one or more anti-rotation elements of the adjacent modular manifold body to minimize rotation of the modular manifolds relative to each other, such as during assembly.

In the illustrated embodiment, the valve bank 10 is a pneumatic valve bank that utilizes compressed air as a working fluid for controlling one or more actuators or other movable members on a machine (not shown), such as an automation machine in an assembly plant, for example. As shown, the valve bank 10 includes a plurality of valve sections 18. Generally, each valve section 18 may be configured as a discrete modular unit of the valve bank 10, in which each valve section 18 has a corresponding modular fluid manifold (collectively referred to with reference numeral 14) that constitutes a base of the valve section 18. These modular fluid manifolds 14 are fluidly coupled together to form the manifold valve assembly 12 that serves as an air manifold in the illustrated embodiment, which provides a continuous fluid flow path across the various modular manifolds 14 for supplying air to each valve section 18 in a known manner.

In exemplary embodiments, at least one of the valve sections 18 includes a supply module 14e having an inlet port 20 for supplying fluid, such as air, from a source, such as an air compressor, to the valve bank 10. In addition, at least one of the valve sections 18 includes a control valve 22, such as a pneumatic control valve, which may have a valve spool or other control member that moves within a valve body to permit, restrict and/or control the flow of the working fluid through different fluid passages in the valve body to control the movable member of the machine in a known manner. As shown, the valve bank 10 further includes end caps 24a and 24b on opposite ends of the manifold that are configured to contain the working fluid in the manifold. It is understood that although the exemplary valve bank 10 has a plurality of valve sections 18, other such valve banks may have greater or fewer valve sections, such as one or more valve sections. It is also understood that although the exemplary valve bank 10 is a pneumatic valve bank, other types of valve banks may be utilized, such as hydraulic valve banks or the like.

Referring to FIGS. 4-9, the exemplary modular fluid manifold 14a will be described in further detail. As discussed above, each modular fluid manifold (e.g., 14a) is configured to interface with, and operatively couple to, an adjacent modular manifold (e.g., 14b and/or 14e) to form the exemplary fluid manifold assembly 12. Accordingly, although features will be described below chiefly in the context of the exemplary modular manifold 14a, it is understood that certain structures and features of the modular manifold 14a are common to the other modular manifolds 14b-14e in the manifold assembly 12 shown in FIGS. 1-3.

Consequently, the same or similar reference numerals are used to denote structures corresponding to the same or similar structures in the modular manifolds 14a-14b. In this regard, reference may be had to any of FIGS. 1-9 for showing the various features described below.

As shown in the illustrated embodiment, the manifold body 16a of the modular manifold 14a has a generally parallelepiped shape, including a front side 26, a rear side 27, a top side 28, a bottom side 29, a left side 30, and a right side 31. As shown, the right side 31 is configured having a first mating face 32, and the opposite left side 30 is configured having a second mating face 34 of the manifold body 16a. Each mating face includes one or more fluid ports 36, with one or more internal fluid passages fluidly connecting the ports 36 on opposite sides of the body 16a. The mating faces 32, 34 on each side of the body 14a are configured to interface with a corresponding mating face 34, 32 of a juxtaposed modular fluid manifold (e.g., 14b), such that when the modular manifolds 14a, 14b are coupled together the fluid ports 36 on the first face 32 of the first manifold body 16a are fluidly coupled to the fluid ports 36 on the second face 34 of the second manifold body 64b. In exemplary embodiments, a gasket or other seal is interposed between first and second mating faces of the respective manifold bodies 16a, 16b to improve sealing functionality. As discussed above, such a configuration enables the modular manifolds (e.g., 14a, 14b, etc.) to couple together to form the manifold assembly 12 which provides a continuous fluid flow path across the various modular manifolds 14a-14e for supplying air to each valve section 28 of the valve bank 10 in a known manner.

As shown, the top side 28 of the modular manifold body 16a also includes one or more fluid ports 37 on an outwardly addressable face 38 of the body, which are fluidly connected via the internal fluid passages. Generally, the ports 37 on the top side 28 of the body are utilized to fluidly couple the one or more air control valves 22 (or other modules) to the modular manifold 14a (as shown in FIGS. 1-3, for example). In exemplary embodiments, one or more of the manifold bodies 14 of the valve bank may have inlet and/or outlet ports 39 on the front side of the body for coupling to an external fluid source and/or external fluid operated device.

In exemplary embodiments, the modular manifold body 16a also may include an electrical cavity 40 that is configured to contain one or more electronic devices, such as controllers, circuit boards, solenoids, electrical cables, or the like, which are used for controlling the air control valves. As shown, the top side 28 of the body includes an electrical port 41 connected to the cavity 40 for connecting the electronic device(s) to the air control valves 22 (or other modules). The electrical cavity 400 may be open on both sides 30, 31 of the manifold body such that coupled first body 16a and second body 16b may form an elongated cavity extending through at least a portion of the manifold assembly 12.

As discussed above, each manifold body 16a, 16b, etc. includes one or more anti-rotation elements that cooperate with one or more anti-rotation elements of the adjacent modular manifold body to minimize rotation of the modular manifold bodies relative to each other when the manifold bodies are operatively coupled together. In the illustrated embodiment, the anti-rotation elements are configured as one or more anti-rotation protrusions 44 (e.g., 44a-44d) extending outwardly from the first mating face 32, and one or more anti-rotation recesses 46 (e.g., 46a-46d) extending inwardly from the second mating face 34. As shown, the locations of the one or more anti-rotation protrusions 44a-44d are a mirror image of the locations of the one or more anti-rotation recesses 46a-46d relative to a plane A-A that bisects the manifold body 14a and that is parallel to both the first and second mating faces 32, 34. This enhances the modular functionality of the respective modular manifolds 14a, 14b, such that the first manifold body 16a may be operatively coupled to the second manifold body 16b with the respective mating faces 32, 34 in juxtaposition, and such that the one or more anti-rotation protrusions 44a-44d of the first manifold body 16a are received by the anti-rotation recesses 46a-46d of the second manifold body 16b.

As shown in the illustrated embodiment, the anti-rotation protrusions 44 and the anti-rotation recesses 46 each have at least one flat surface 48, 49 that engage with each other to help restrict rotation of the first manifold body 16a relative to the second manifold body 16b. More particularly, each anti-rotation protrusion 44 and anti-rotation recess 46 may be parallelepiped-shaped, such as square or rectangular shaped. In exemplary embodiments, one or more corners of the parallelepiped-shaped anti-rotation protrusion 44 and one or more corners of the parallelepiped-shaped anti-rotation recess 46 are rounded corners, which may help facilitate the mating of these anti-rotation elements relative to each other. Generally, the depth of the anti-rotation protrusions 44 and/or the anti-rotation recesses 46 should be sufficient to resist deformation or fracture of these elements during assembly or shipping.

In exemplary embodiments, the manifold body 16a includes a plurality of anti-rotation protrusions 44, such as two, three, four or more such protrusions. In the illustrated embodiment, the first anti-rotation protrusion 44a is located toward a front side 26 of the first manifold body 16a, and a second anti-rotation protrusion 44b is located toward an opposite rear side 27 of the manifold body 16a. More particularly, the first anti-rotation protrusion 44a is located toward a top-front of the first manifold body 16a, and the second anti-rotation protrusion 44b is located toward a bottom-rear of the first manifold body 16a. In addition, the manifold body includes the third anti-rotation protrusion 44c located toward a bottom-front of the first manifold body 16a, and the fourth anti-rotation protrusion 44d is located toward a top-rear of the first manifold body 16a.

As discussed above, the respective locations of the anti-rotation recesses 46 (including the first 46a, second 46b, third 46c, and fourth 46d recess) may be a mirror image of the locations of the one or more anti-rotation protrusions 44a-44d. In addition, since each manifold body 16a-16d may be configured to have the same or similar anti-rotation features to enhance modularity, the second adjacent manifold body 16b may have anti-rotation recesses 46a-46d at locations that correspond to the locations of the anti-rotation protrusions 44a-44d of the first manifold body 16a when the manifold bodies 16a, 16b are operatively coupled together, such that each anti-rotation protrusion 44a-44d is received by the corresponding anti-rotation recess 46a-46d (as illustrated in FIG. 3, for example).

As shown in the illustrated embodiment of FIGS. 4-9, the first 44a, second 44b, third 44c, and fourth 44d anti-rotation protrusions may be located at respective peripheral edges and/or corners of the first mating face 32 of the manifold body 16a. Such placement of the anti-rotation protrusions 44 toward the outside edges (e.g., radially outwardly from the center of rotation) may enhance the anti-rotation functionality provided by these anti-rotation protrusions as they interlockingly engage with the respective anti-rotation recesses 46 in the adjacently coupled manifold body. It is understood, however, that some manifold bodies may extend beyond the mating face portion of the body, as shown with respect to the supply manifold 14e in FIGS. 1-3. In this regard, it is understood that the peripheral edges and/or corners of the mating face constitute the edges of the mating face portion of the body having which is configured to be modularly interfaced with an adjacent modular manifold to establish fluid connection between the bodies in the manner shown and described above, for example.

In exemplary embodiments, the anti-rotation elements may be configured with unique tolerances that are configured to facilitate ease of assembly of the fluid manifold assembly, while also minimizing stack-up. For example, one or more of the anti-rotation protrusions 44 of a first manifold body 16a may be configured to mate with one or more anti-rotation recesses 46 of the second manifold body 16b in such a way to provide a slip-fit tolerance and/or zero clearance with respect to each other. In addition, one or more other anti-rotation protrusions 44 of the first manifold body 16a may be configured to mate with one or more other anti-rotation recesses 46 of the second manifold body 16b in such a way to provide a greater amount of tolerance than a slip-fit tolerance and/or zero clearance.

For example, in the illustrated embodiment, the first anti-rotation protrusion 44a and the first anti-rotation recess 46a are respectively configured to provide a slip-fit tolerance and/or zero clearance with respect to each other when the first manifold body 16a is operatively coupled to the second manifold body 16b. In addition, the second anti-rotation protrusion 44b and the second anti-rotation recess 46b are respectively configured to provide a slip-fit tolerance and/or zero clearance with respect to each other when the first manifold body 16a is operatively coupled to the second manifold body 16b. More particularly, the manifold bod(ies) 16a, 16b may be configured such that the vertical dimensions H1A and H1B shown in the illustrated embodiment at the respective first anti-rotation protrusion 44a and first anti-rotation recess 46a, and the vertical dimensions H2A and H2B respectively shown at the second anti-rotation protrusion 44b and second anti-rotation recess 46b, may create the slip-fit tolerance and/or zero clearance condition between the interfaced anti-rotation elements. Alternatively or additionally, the horizontal dimension of these respective anti-rotation protrusions 44a, 44b and anti-rotation recesses 46a, 46b may be configured with a slip-fit and/or zero clearance tolerancing. As is commonly used in the art, the term "slip-fit" as used herein means that the clearance between the two mating parts is tight, but not so tight that assembly friction would prevent proper slidable mating of the parts.

As shown in the illustrated embodiment, the first anti-rotation protrusion 44a is diagonal from the second anti-rotation protrusion 44b across the first mating face 32 relative to the third 44c and fourth 44d anti-rotation protrusions. In addition, the third anti-rotation protrusion 44c is diagonal from the fourth anti-rotation protrusion 44d across the first mating face 32 relative to the first 44a and second 44b anti-rotation protrusions. Likewise, the first anti-rotation recess 46a is diagonal from the second anti-rotation recess 46b across the second mating face 34 relative to the third 46c and fourth 46d anti-rotation recesses, and the third anti-rotation recess 46c is diagonal from the fourth anti-rotation recess 46d across the second mating face 34 relative to the first 46a and second 46b anti-rotation recesses.

Because the direction of rotation during assembly of the bodies may be predetermined (e.g., due to torque generated when fastening), the clearance between the first anti-rotation protrusion 44a and first anti-rotation recess 46a, and the clearance between the second anti-rotation protrusion 44b and second anti-rotation recess 46b, may be controlled via the slip-fit and/or zero clearance tolerancing. In addition, the tolerance between the third anti-rotation protrusion 44c and the third anti-rotation recess 46c, and the tolerance between the fourth anti-rotation protrusion 44d and fourth anti-rotation recess 46d, may be configured to provide a tolerance that is greater than a slip-fit tolerance and/or zero clearance tolerance with respect to each other when the first manifold body 16a is operatively coupled to the second manifold body 16b, which may facilitate ease of assembly between the manifold bodies. More particularly, as shown in the illustrated embodiment, the manifold bod(ies) 16a, 16b may be configured such that the vertical dimensions H3A and H3B shown respectively at the third anti-rotation protrusion 44c and third anti-rotation recess 46c, and the vertical dimensions H4A and H4B respectively shown at the fourth anti-rotation protrusion 44d and fourth anti-rotation recess 46d, may create a greater tolerance than a slip-fit tolerance and/or zero clearance condition. Alternatively or additionally, the horizontal dimension of these respective anti-rotation protrusions 44c, 44d and anti-rotation recesses 46c, 46d may be configured with a greater tolerancing than a slip-fit and/or zero clearance tolerancing.

Such configuration(s) of the manifold bod(ies) 16a, 16b may facilitate assembly while also helping to prevent each modular manifold body from compounding the amount of twisting that each manifold body can experience during assembly or while in use. More particularly, such configuration(s) may center the mean of the tolerance of a stack of bodies near or at zero, and then may remove half of the tolerance because the clearance will be either large or small, but not both, since the relative tolerances will counteract each other instead of compounding each other. In other words, such configuration(s), in essence, may create a statistical stack-up of the manifold assembly 12 of near or at zero, since the slip-fit and/or zero tolerancing of some of the anti-rotation elements centers the mean of the tolerance at or near zero, and the anti-rotation elements with the greater tolerance will allow some units to be at the high side of the tolerance range, and some units will be at the low side of the tolerance range, which causes the mean over assembling multiple such units to be at or near zero. In addition, such a reduction in the compounding effect over multiple-coupled modular manifolds 14a-14e may prevent large gaps from forming at either end of the valve bank 12, which can prevent leakage of the operating fluid, for example.

In exemplary embodiments, the first manifold body 16a is operatively coupled to the second manifold body 16b with at least one fastener 50 (shown in FIG. 2, for example). As shown, the second manifold body 16b (or left side 30 of the first manifold body 16a) has at least one through-hole 52 configured to receive the at least one fastener 50, in which the through-hole 52 has an opening 54 in a recessed back surface 56 of the anti-rotation recess 46 that is configured to permit the at least one fastener 50 to protrude therethrough. As shown, the first manifold body 16a has a fastener receiver portion 58 extending through the anti-rotation protrusion 44, in which the fastener receiver portion 58 has an opening 60 in a forward surface 62 of the anti-rotation protrusion 44 that is configured to receive the at least one fastener 50 to operatively couple the first manifold body 16a and the second manifold body 16b after the at least one fastener 50 has been inserted through the through-hole 52 of the second manifold body. Also as shown in the illustrated embodiment, a recessed portion 64 is provided in the front face 26 and the back face 27 of the manifold body 16a. The recessed portion 64 is configured to permit the at least one fastener 50 to be inserted through a second opening 65 of the through-hole 52 that is opposite the opening 54 in the recessed back surface 56 of the anti-rotation recess 46. In exemplary embodiments, the fastener 50 is a bolt, and the through-hole 52 permits slidable insertion of the bolt, and the fastening receiver 58 is a threaded bore that threadably receives the threads of the bolt.

As discussed above with reference to FIGS. 1-3, the fluid manifold assembly 12 also includes first and second end caps 24a and 24b on opposite sides of the manifold assembly that are configured to close the fluid flow paths of the assembly to contain the operating fluid. In the illustrated embodiment, the first end cap 24a has anti-rotation protrusions 44 that are configured to be received by the anti-rotation recesses 46 of at least one of the plurality of modular fluid manifolds (e.g., 14e), and the opposite second end cap 24b has anti-rotation recesses 46 that are configured to receive the anti-rotation protrusions 44 of at least one other of the plurality of modular fluid manifolds (e.g. 14b). These end plates 24a, 24b may be operatively coupled to the modular manifold bodies 16 with fasteners in the same manner that each manifold body is operatively coupled together, as described above. In addition, each end plate 24a, 24b may have fastening receivers 66, such as bolt holes (shown in FIGS. 1 and 2, for example), that allow the valve bank 10 to be secured to a suitable substrate, such as a tooling plate, cabinet, frame of a workstation, housing of a machine, or the like.

It should be apparent to those skilled in the art that other designs could also be used with the present invention. The invention is not limited to any particular valve bank, fluid manifold assembly, and/or modular fluid manifold(s) designs, but rather is appropriate for a wide variety of such designs.

An exemplary fluid manifold assembly for an exemplary valve bank has been described herein, in which the manifold assembly includes a plurality of modular fluid manifolds that are operatively coupled together, and each modular manifold includes one or more anti-rotation elements that cooperate with each other to minimize rotation of the modular manifolds relative to each other, such as during assembly. The anti-rotation elements may include anti-rotation protrusion(s) that extend outwardly from a mating face of a first modular manifold body, and anti-rotation recess(es) that extend inwardly from a corresponding mating face of a second modular manifold body, in which the anti-rotation protrusion(s) of the first body are configured to be received by the anti-rotation recess(es) of the second body. The anti-rotation elements may be configured to interface with each other with particular tolerances that facilitate ease of assembly of the fluid manifold assembly, while minimizing tolerance stack-up.

The exemplary manifold assembly and/or modular fluid manifold(s) according to the present disclosure solve problems associated with the manifold assembly twisting when assembled, particularly for larger manifold banks. Current manifold assemblies have issues with compounding the twisting effect as the modular manifolds are assembled. This is an issue because when the manifold banks are large, there could be a relatively large gap, such as ¼-inch or more, at either end of the bank. Such a gap may cause leakage of the operating fluid when fully bolted together.

The exemplary manifold bod(ies) according to the present disclosure utilize anti-rotation elements and/or interlocking elements to align the modular manifolds relative to each other. In exemplary embodiments, these anti-rotation elements and/or interlocking elements are configured to provide a slip fit or zero clearance and/or stack-up at nominal, which may allow the manifold assembly to lay flat on a mounting substrate as the manifold bank is increased in size. The anti-rotation elements and/or interlocking elements may be unitary with the manifold body, or these elements may be attached to the manifold body. The anti-rotation elements and/or interlocking elements may be cast pins, pads with at least one flat, parallelepiped-shaped protrusions, or other similar/suitable configurations.

In exemplary embodiments, the design utilizes four mounting pads that serve as a rotational stop. In exemplary embodiments, the pads are moved as far away from the center of rotation and/or each other as possible. This may reduce the maximum amount of twist between the coupled manifold bodies. In exemplary embodiments, the pads will form a step on a male side and corresponding step on a female side. It will resist rotation caused by torqueing the manifold by creating contact between the two steps.

One unique aspect of according to the present disclosure is the tolerancing of the steps. Generally, for example, a first pad and second pad may be diagonal from each other across a face of the body, and a third pad and fourth pad may be diagonal from each other across the face of the body. A vertical dimension at the first and second pads may create a zero-clearance condition at nominal. Since the direction of rotation during assembly is predictable, the clearance of the first and second pads can be tightly controlled, and the third and fourth pads may have a larger tolerance to allow the manifolds to assemble easily. This also may center the mean of the tolerance at zero and then remove half of the tolerance because it is either large or small, but not both. This configuration may stop each manifold body from compounding the amount of twisting each manifold body can experience. It also may create a statistical stack of zero because as the manifold bodies are assembled together, some will be at the high side and some will be at the low side, causing the mean to equal zero. Thus, instead of compounding each other, the design will counteract each other.

According to one aspect of the invention, a fluid manifold assembly for a valve bank includes: a first modular fluid manifold having a first manifold body, the first manifold body having a first mating face, and an anti-rotation protrusion extending outwardly from the first mating face; a second modular fluid manifold having a second manifold body, the second manifold body having a second mating face, and an anti-rotation recess extending inwardly from the second mating face; wherein the first manifold body is operatively coupled to the second manifold body such that the first mating face is adjacent to the second mating face, and such that the anti-rotation protrusion of the first manifold body is received by the anti-rotation recess of the second manifold body; and wherein the anti-rotation protrusion and the anti-rotation recess are configured to cooperate with each other to minimize rotation of the first manifold body relative to the second manifold body.

Embodiments of the invention may include one or more of the following additional features separately or in any combination.

In some embodiments, the first mating face has a first fluid port, and the second mating face has a second fluid port.

In some embodiments, when the first manifold body is operatively coupled to the second manifold body, the first fluid port is fluidly coupled to the second fluid port.

In some embodiments, a gasket is interposed between first and second mating faces.

In some embodiments, the anti-rotation protrusion is a first anti-rotation protrusion, the first manifold body having a second anti-rotation protrusion extending outwardly from the first mating face.

In some embodiments, the anti-rotation recess is a first anti-rotation recess, the second manifold body having a second anti-rotation recess extending inwardly from the second mating face.

In some embodiments, when the first manifold body is operatively coupled to the second manifold body, the first anti-rotation protrusion is received by the first anti-rotation recess with a slip-fit tolerance, and the second anti-rotation protrusion is received by the second anti-rotation recess with a slip-fit tolerance.

In some embodiments, the first manifold body has a third anti-rotation protrusion and a fourth anti-rotation protrusion, in which each of the third and fourth anti-rotation protrusions extend outwardly from the first mating face.

In some embodiments, the second manifold body has a third anti-rotation recess and a fourth anti-rotation recess, in which each of the third and fourth anti-rotation recesses extend inwardly from the second mating face.

In some embodiments, when the first manifold body is operatively coupled to the second manifold body, the third anti-rotation protrusion is received by the third anti-rotation recess with a tolerance that is greater than a slip-fit tolerance, and the fourth anti-rotation protrusion is received by the fourth anti-rotation recess with a tolerance that is greater than a slip-fit tolerance.

In some embodiments, the first anti-rotation protrusion is diagonal from the second anti-rotation protrusion across the first mating face.

In some embodiments, the third anti-rotation protrusion is diagonal from the fourth anti-rotation protrusion across the first mating face.

In some embodiments, the first anti-rotation recess is diagonal from the second anti-rotation recess across the second mating face.

In some embodiments, the third anti-rotation recess is diagonal from the fourth anti-rotation recess across the second mating face.

In some embodiments, the anti-rotation protrusion is a first anti-rotation protrusion, the first manifold body having a second anti-rotation protrusion extending outwardly from the first mating face, wherein the first anti-rotation protrusion is located toward a front side of the first manifold body, and the second anti-rotation protrusion is located toward an opposite rear side of the first manifold body.

In some embodiments, the anti-rotation recess is a first anti-rotation recess, the second manifold body having a second anti-rotation recess extending inwardly from the second mating face, wherein the first anti-rotation recess is located toward a front side of the second manifold body, and the second anti-rotation recess is located toward an opposite rear side of the second manifold body.

In some embodiments, when the first manifold body is operatively coupled to the second manifold body, the first anti-rotation protrusion is received by the first anti-rotation recess, and the second anti-rotation protrusion is received by the second anti-rotation recess.

In some embodiments, the first manifold body has a third anti-rotation protrusion and a fourth anti-rotation protrusion, in which each of the third and fourth anti-rotation protrusions extend outwardly from the first mating face.

In some embodiments, the second manifold body has a third anti-rotation recess and a fourth anti-rotation recess, in which each of the third and fourth anti-rotation recesses extend inwardly from the second mating face.

In some embodiments, the first anti-rotation protrusion is located toward a top-front of the first manifold body, the second anti-rotation protrusion is located toward a bottom-rear of the first manifold body, the third anti-rotation protrusion is located toward a bottom-front of the first manifold body, and the fourth anti-rotation protrusion is located toward a top-rear of the first manifold body.

In some embodiments, the first anti-rotation recess is located toward a top-front of the second manifold body, the second anti-rotation recess is located toward a bottom-rear of the second manifold body, the third anti-rotation recess is located toward a bottom-front of the second manifold body, and the fourth anti-rotation recess is located toward a top-rear of the second manifold body.

In some embodiments, the first, second, third and fourth anti-rotation protrusions are located at respective peripheral corners of the first mating face.

In some embodiments, the first, second, third and fourth anti-rotation recesses are located at respective peripheral corners of the second mating face.

In some embodiments, the anti-rotation protrusion and the anti-rotation recess each has a flat surface that engage with each other to restrict rotation of the first manifold body relative to the second manifold body.

In some embodiments, the anti-rotation protrusion and the anti-rotation recess are each parallelepiped-shaped.

In some embodiments, one or more corners of the parallelepiped-shaped anti-rotation protrusion and one or more corners of the parallelepiped-shaped anti-rotation recess are rounded corners.

In some embodiments, the first manifold body is operatively coupled to the second manifold body with at least one fastener.

In some embodiments, the second manifold body has a through-hole configured to receive the at least one fastener, the through-hole having an opening in a recessed back surface of the anti-rotation recess of the second manifold body that is configured to permit the at least one fastener to protrude therethrough.

In some embodiments, the first manifold body has a fastener receiver portion extending through the anti-rotation protrusion, the fastener receiver portion having an opening in a forward surface of the anti-rotation protrusion that is configured to receive the at least one fastener to operatively couple the first manifold body and second manifold body after the at least one fastener has been inserted through the through-hole of the second manifold body.

In some embodiments, the second manifold body has a recessed portion in a front face of the second manifold body that is adjacent to the second mating face of the second manifold body, the recessed portion in the front face of the second manifold body being configured to permit the at least one fastener to be inserted through a second opening of the through-hole that is opposite the opening in the recessed back surface of the anti-rotation recess.

In some embodiments, the fluid manifold assembly includes a plurality of modular fluid manifolds, the plurality of modular fluid manifolds including at least the first modular fluid manifold and the second modular fluid manifold, in which each of the plurality of modular fluid manifolds includes a manifold body having a first mating face on one side of the manifold body and an second mating face on an opposite side of the manifold body, the first mating face having at least one anti-rotation protrusion extending outwardly from the first mating face, and the second mating face having at least one anti-rotation recess extending inwardly from the second mating face.

In some embodiments, the fluid manifold assembly further includes a first end cap on one side of the manifold assembly and a second end cap on an opposite side of the manifold assembly, the first end cap having at least one anti-rotation protrusion that is configured to be received by the anti-rotation recess of at least one of the plurality of modular fluid manifolds, and the second end cap having at least one anti-rotation recess that is configured to receive the anti-rotation protrusion of at least one of the plurality of modular fluid manifolds.

According to another aspect of the invention, a pneumatic valve bank includes: the fluid manifold assembly having one or more of the foregoing or following features in any combination, in which the fluid manifold assembly is configured as a pneumatic manifold assembly; and one or more air control valves operatively coupled to the pneumatic manifold assembly.

In some embodiments, the first manifold body and/or the second manifold body further includes one or more fluid ports on an outwardly addressable face of the body, in which the one or more fluid ports are fluidly coupled to the one or more air control valves.

In some embodiments, the first manifold body and/or the second manifold body further includes an internal cavity that is configured to contain one or more electronic devices.

According to another aspect of the invention, a fluid manifold assembly for a valve bank includes: a first modular fluid manifold having a first manifold body, the first manifold body having a first mating face, and having first and second anti-rotation protrusions extending outwardly from the first mating face; a second modular fluid manifold having a second manifold body, the second manifold body having a second mating face, and having first and second anti-rotation recesses extending inwardly from the second mating face; wherein the first manifold body is operatively coupled to the second manifold body such that the first mating face is adjacent to the second mating face, and such that the first anti-rotation protrusion is received by the first anti-rotation recess and the second anti-rotation protrusion is received by the second anti-rotation recess; wherein the first anti-rotation protrusion and the first anti-rotation recess are respectively configured to provide a slip-fit tolerance with respect to each other when the first manifold body is operatively coupled to the second manifold body; and wherein the second anti-rotation protrusion and the second anti-rotation recess are respectively configured to provide a tolerance with respect to each other that is greater than a slip-fit tolerance when the first manifold body is operatively coupled to the second manifold body.

Embodiments of the invention may include one or more of the following additional features separately or in any combination.

In some embodiments, the first manifold body has a third anti-rotation protrusion and a fourth anti-rotation protrusion, in which each of the third and fourth anti-rotation protrusions extend outwardly from the first mating face.

In some embodiments, the second manifold body has a third anti-rotation recess and a fourth anti-rotation recess, in which each of the third and fourth anti-rotation recesses extend inwardly from the second mating face.

In some embodiments, when the first manifold body is operatively coupled to the second manifold body, the third anti-rotation protrusion is received by the third anti-rotation recess with a slip-fit tolerance, and the fourth anti-rotation protrusion is received by the fourth anti-rotation recess with a tolerance that is greater than a slip-fit tolerance.

In some embodiments, the first anti-rotation protrusion is diagonal from the third anti-rotation protrusion across the first mating face relative to the second and fourth anti-rotation protrusions, and wherein the second anti-rotation protrusion is diagonal from the fourth anti-rotation protrusion across the first mating face relative to the first and third anti-rotation protrusions.

In some embodiments, the first anti-rotation recess is diagonal from the third anti-rotation recess across the second mating face relative to the second and fourth anti-rotation recesses, and wherein the second anti-rotation recess is diagonal from the fourth anti-rotation recess across the second mating face relative to the first and third anti-rotation recesses.

According to another aspect of the invention, a modular fluid manifold includes: a manifold body having a first mating face on one side of the manifold body, and a second mating face on an opposite side of the manifold body, one or more fluid ports on the first and/or second mating face; one or more anti-rotation protrusions extending outwardly from the first mating face; and one or more anti-rotation recesses extending inwardly from the second mating face; wherein the locations of the one or more anti-rotation protrusions are a mirror image of the locations of the one or more anti-rotation recesses relative to a plane that bisects the manifold body and that is parallel to both the first and second mating faces.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities.

As used herein, the term "near" or "about" refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

It is furthermore understood that terms such as "top," "bottom," "upper," "lower," "left," "right," "front," "rear," "forward," "rearward," and the like as used herein may refer to an arbitrary frame of reference, rather than to the ordinary gravitational frame of reference.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid manifold assembly for a valve bank, the manifold assembly comprising:
   a first modular fluid manifold having a first manifold body, the first manifold body having a first mating face that faces in a first direction, and an anti-rotation protrusion extending outwardly in the first direction from the first mating face;
   a second modular fluid manifold having a second manifold body, the second manifold body having a second mating face facing in a second direction opposite the first direction, and an anti-rotation recess extending inwardly in the first direction from the second mating face;
   wherein the first manifold body is operatively coupled to the second manifold body such that the first mating face is adjacent to and faces the second mating face, and such that the anti-rotation protrusion of the first manifold body is received by the anti-rotation recess of the second manifold body;
   wherein the anti-rotation protrusion and the anti-rotation recess are configured to cooperate with each other to minimize rotation of the first manifold body relative to the second manifold body;
   wherein the first manifold body is operatively coupled to the second manifold body with at least one fastener;
   wherein the second manifold body has an opening in a recessed back surface of the anti-rotation recess of the second manifold body, the recessed back surface facing in the second direction toward the anti-rotation protrusion, and a first part of the at least one fastener extending in the first direction into the opening in the recessed back surface; and
   wherein the first manifold body has an opening in a forward surface of the anti-rotation protrusion, the forward surface facing in the first direction toward the anti-rotation recess, and a second part of the at least one fastener extending in the second direction into the opening in the anti-rotation protrusion to operatively couple the first manifold body and second manifold body.

2. The fluid manifold assembly according to claim 1,
   wherein the first mating face has a first fluid port, and the second mating face has a second fluid port, and
   wherein, when the first manifold body is operatively coupled to the second manifold body, the first fluid port is fluidly coupled to the second fluid port, and
   optionally, wherein a gasket is interposed between first and second mating faces.

3. The fluid manifold assembly according to claim 1,
   wherein the anti-rotation protrusion is a first anti-rotation protrusion, the first manifold body having a second anti-rotation protrusion extending outwardly from the first mating face;
   wherein the anti-rotation recess is a first anti-rotation recess, the second manifold body having a second anti-rotation recess extending inwardly from the second mating face; and
   wherein, when the first manifold body is operatively coupled to the second manifold body, the first anti-rotation protrusion is received by the first anti-rotation recess with a slip-fit, and the second anti-rotation protrusion is received by the second anti-rotation recess with a slip-fit.

4. The fluid manifold assembly according to claim 3,
   wherein the first manifold body has a third anti-rotation protrusion and a fourth anti-rotation protrusion, in which each of the third and fourth anti-rotation protrusions extend outwardly from the first mating face;
   wherein the second manifold body has a third anti-rotation recess and a fourth anti-rotation recess, in which each of the third and fourth anti-rotation recesses extend inwardly from the second mating face; and
   wherein, when the first manifold body is operatively coupled to the second manifold body, the third anti-rotation protrusion is received by the third anti-rotation recess with a clearance that is greater than a slip-fit, and the fourth anti-rotation protrusion is received by the fourth anti-rotation recess with a clearance that is greater than a slip-fit.

5. The fluid manifold assembly according to claim 4,
   wherein the first anti-rotation protrusion is diagonal from the second anti-rotation protrusion across the first mating face, and wherein the third anti-rotation protrusion is diagonal from the fourth anti-rotation protrusion across the first mating face; and
   wherein the first anti-rotation recess is diagonal from the second anti-rotation recess across the second mating face, and wherein the third anti-rotation recess is diagonal from the fourth anti-rotation recess across the second mating face.

6. The fluid manifold assembly according to claim 1,
   wherein the anti-rotation protrusion is a first anti-rotation protrusion, the first manifold body having a second anti-rotation protrusion extending outwardly from the first mating face, wherein the first anti-rotation protrusion is located toward a front side of the first manifold body, and the second anti-rotation protrusion is located toward an opposite rear side of the first manifold body; and
   wherein the anti-rotation recess is a first anti-rotation recess, the second manifold body having a second anti-rotation recess extending inwardly from the second mating face, wherein the first anti-rotation recess is located toward a front side of the second manifold body, and the second anti-rotation recess is located toward an opposite rear side of the second manifold body; and
   wherein, when the first manifold body is operatively coupled to the second manifold body, the first anti-rotation protrusion is received by the first anti-rotation recess, and the second anti-rotation protrusion is received by the second anti-rotation recess.

7. The fluid manifold assembly according to claim 6,
   wherein the first manifold body has a third anti-rotation protrusion and a fourth anti-rotation protrusion, in which each of the third and fourth anti-rotation protrusions extend outwardly from the first mating face;
   wherein the second manifold body has a third anti-rotation recess and a fourth anti-rotation recess, in which each of the third and fourth anti-rotation recesses extend inwardly from the second mating face;
   wherein, when the first manifold body is operatively coupled to the second manifold body, the third anti-rotation protrusion is received by the third anti-rotation recess, and the fourth anti-rotation protrusion is received by the fourth anti-rotation recess;
   wherein the first anti-rotation protrusion is located toward a top-front of the first manifold body, the second anti-rotation protrusion is located toward a bottom-rear of the first manifold body, the third anti-rotation protrusion is located toward a bottom-front of the first manifold body, and the fourth anti-rotation protrusion is located toward a top-rear of the first manifold body; and wherein the first anti-rotation recess is located toward a top-front of the second manifold body, the second anti-rotation recess is located toward a bottom-rear of the second manifold body, the third anti-rotation recess is located toward a bottom-front of the second manifold body, and the fourth anti-rotation recess is located toward a top-rear of the second manifold body.

8. The fluid manifold assembly according to claim 7, wherein the first, second, third and fourth anti-rotation protrusions are located at respective peripheral corners of the first mating face; and wherein the first, second, third and fourth anti-rotation recesses are located at respective peripheral corners of the second mating face.

9. The fluid manifold assembly according to claim 1, wherein the anti-rotation protrusion and the anti-rotation recess each has a flat surface that engage with each other to restrict rotation of the first manifold body relative to the second manifold body;

wherein the anti-rotation protrusion and the anti-rotation recess are each parallelepiped-shaped; and, wherein one or more corners of the parallelepiped-shaped anti-rotation protrusion and one or more corners of the parallelepiped-shaped anti-rotation recess are rounded corners.

10. The fluid manifold assembly according to claim 1, wherein the second manifold body has a through-hole configured to receive the at least one fastener, the through-hole having the opening in the recessed back surface of the anti-rotation recess of the second manifold body; and wherein the opening in the forward surface of the anti-rotation protrusion of the first manifold body is configured to receive the at least one fastener to operatively couple the first manifold body and second manifold body after the at least one fastener has been inserted through the through-hole of the second manifold body.

11. The fluid manifold assembly according to claim 10, wherein the second manifold body has a recessed portion in a front face of the second manifold body that is adjacent to the second mating face of the second manifold body, the recessed portion in the front face of the second manifold body being configured to permit the at least one fastener to be inserted through a second opening of the through-hole that is opposite the opening in the recessed back surface of the anti-rotation recess.

12. The fluid manifold assembly according to claim 1, wherein the fluid manifold assembly includes a plurality of modular fluid manifolds, the plurality of modular fluid manifolds including at least the first modular fluid manifold and the second modular fluid manifold, in which each modular fluid manifold of the plurality of modular fluid manifolds includes a manifold body having a first mating face on one side of the manifold body and a second mating face on an opposite side of the manifold body, the first mating face having at least one anti-rotation protrusion extending outwardly from the first mating face, and the second mating face having at least one anti-rotation recess extending inwardly from the second mating face; and wherein the fluid manifold assembly further includes a first end cap on one side of the manifold assembly and a second end cap on an opposite side of the manifold assembly, the first end cap having at least one anti-rotation protrusion that is configured to be received by the anti-rotation recess of at least one of the plurality of modular fluid manifolds, and the second end cap having at least one anti-rotation recess that is configured to receive the anti-rotation protrusion of at least one of the plurality of modular fluid manifolds.

13. A pneumatic valve bank comprising:
the fluid manifold assembly according to claim 1, in which the fluid manifold assembly is configured as a pneumatic manifold assembly; and
one or more air control valves operatively coupled to the pneumatic manifold assembly.

14. The pneumatic valve bank according to claim 13, wherein the first manifold body and/or the second manifold body further includes one or more fluid ports on an outwardly addressable face of the body, in which the one or more fluid ports are fluidly coupled to the one or more air control valves.

15. The pneumatic valve bank according to claim 13, wherein the first manifold body and/or the second manifold body further includes an internal cavity that is configured to contain one or more electronic devices.

16. The fluid manifold assembly according to claim 1, wherein the first manifold body has a recessed area in a side of the first manifold body in which the recessed area is behind the anti-rotation protrusion, and/or the second manifold body has a recessed area in a side of the second manifold body in which the recessed area is behind the anti-rotation recess;

wherein the opening in the forward surface of the anti-rotation protrusion of the first manifold body is a first opening, and the opening in the recessed back surface of the anti-rotation recess of the second manifold body is a second opening;

wherein the first manifold body and/or the second manifold body includes a third opening in a surface of the recessed area; and wherein the at least one fastener extends into the first, second, and third openings to operatively couple the first manifold body to the second manifold body.

17. A fluid manifold assembly for a valve bank, the manifold assembly comprising:
a first modular fluid manifold having a first manifold body, the first manifold body having a first mating face, and having first and second anti-rotation protrusions extending outwardly from the first mating face;
a second modular fluid manifold having a second manifold body, the second manifold body having a second mating face, and having first and second anti-rotation recesses extending inwardly from the second mating face;
wherein the first manifold body is operatively coupled to the second manifold body such that the first mating face is adjacent to the second mating face, and such that the first anti-rotation protrusion is received by the first anti-rotation recess and the second anti-rotation protrusion is received by the second anti-rotation recess;
wherein the first anti-rotation protrusion and the first anti-rotation recess are together configured to provide a slip-fit with respect to each other when the first manifold body is operatively coupled to the second manifold body;
wherein the second anti-rotation protrusion and the second anti-rotation recess are together configured to provide a clearance with respect to each other that is greater than a slip-fit when the first manifold body is operatively coupled to the second manifold body;

wherein the first manifold body is operatively coupled to the second manifold body with at least a first fastener and a second fastener;

wherein the second manifold body has an opening in a first recessed back surface of the first anti-rotation recess that is configured to permit the first fastener to extend therethrough, and the second manifold body has an opening in a second recessed back surface of the second anti-rotation recess that is configured to permit the second fastener to extend therethrough; and wherein the first manifold body has a first fastener receiver portion extending through the first anti-rotation protrusion in which the first fastener receiver portion has an opening in a forward surface of the first anti-rotation protrusion that is configured to receive the first fastener, and the first manifold body has a second fastener receiver portion extending through the second anti-rotation protrusion in which the second fastener receiver portion has an opening in a forward surface of the second anti-rotation protrusion that is configured to receive the second fastener.

18. The fluid manifold assembly according to claim 17, wherein the first manifold body has a third anti-rotation protrusion and a fourth anti-rotation protrusion, in which each of the third and fourth anti-rotation protrusions extend outwardly from the first mating face;

wherein the second manifold body has a third anti-rotation recess and a fourth anti-rotation recess, in which each of the third and fourth anti-rotation recesses extend inwardly from the second mating face; and wherein, when the first manifold body is operatively coupled to the second manifold body, the third anti-rotation protrusion is received by the third anti-rotation recess with a slip-fit, and the fourth anti-rotation protrusion is received by the fourth anti-rotation recess with a clearance that is greater than a slip-fit.

19. The fluid manifold assembly according to claim 18, wherein the first anti-rotation protrusion is diagonal from the third anti-rotation protrusion across the first mating face relative to the second and fourth anti-rotation protrusions, and wherein the second anti-rotation protrusion is diagonal from the fourth anti-rotation protrusion across the first mating face relative to the first and third anti-rotation protrusions; and wherein the first anti-rotation recess is diagonal from the third anti-rotation recess across the second mating face relative to the second and fourth anti-rotation recesses, and wherein the second anti-rotation recess is diagonal from the fourth anti-rotation recess across the second mating face relative to the first and third anti-rotation recesses.

20. A fluid manifold assembly for a valve bank, the fluid manifold assembly comprising:

a first modular fluid manifold having a first manifold body, the first manifold body having a first mating face, and anti-rotation protrusions extending outwardly from the first mating face;

a second modular fluid manifold having a second manifold body, the second manifold body having a second mating face, and an anti-rotation recesses extending inwardly from the second mating face;

wherein the first manifold body is operatively coupled to the second manifold body such that the first mating face is adjacent to the second mating face, and such that the anti-rotation protrusions of the first manifold body are received by corresponding ones of the anti-rotation recesses of the second manifold body;

wherein the anti-rotation protrusions and the anti-rotation recesses are configured to cooperate with each other to minimize rotation of the first manifold body relative to the second manifold body;

wherein the first manifold body is operatively coupled to the second manifold body with fasteners;

wherein each of the anti-rotation recesses of the second manifold body has a recessed back surface with an opening in the recessed back surface, the respective openings of the anti-rotation recesses being configured to permit respective ones of the fasteners to extend therethrough;

wherein each of the anti-rotation protrusions of the first manifold body has a fastener receiver portion extending through the anti-rotation protrusion in which the fastener receiver portion has an opening in a forward surface of the anti-rotation protrusion, the respective openings of the anti-rotation protrusions being configured to receive the respective ones of the fasteners to operatively couple the first manifold body and second manifold body; wherein the first manifold body has a second mating face on a side of the first manifold body opposite the first mating face, one or more fluid ports on the first and/or second mating face of the first manifold body; and anti-rotation recesses extending inwardly from the second mating face of the first manifold body;

wherein the locations of the anti-rotation protrusions of the first manifold body are a mirror image of the locations of the anti-rotation recesses of the first manifold body relative to a plane that bisects the manifold body and that is parallel to both the first and second mating faces.

* * * * *